(12) United States Patent
Kobayashi et al.

(10) Patent No.: US 12,736,829 B2
(45) Date of Patent: Sep. 15, 2026

(54) OPTICAL SYSTEM INCLUDING TRANSMISSIVE REFLECTIVE SURFACE AND DISPLAY APPARATUS INCLUDING OPTICAL SYSTEM

(71) Applicant: CANON KABUSHIKI KAISHA, Tokyo (JP)

(72) Inventors: Yuma Kobayashi, Tochigi (JP); Yu Miyajima, Tochigi (JP); Kazuto Ishida, Tochigi (JP); Keigo Yarita, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 337 days.

(21) Appl. No.: 18/537,966

(22) Filed: Dec. 13, 2023

(65) Prior Publication Data

US 2024/0248321 A1 Jul. 25, 2024

(30) Foreign Application Priority Data

Jan. 24, 2023 (JP) ................................ 2023-008468

(51) Int. Cl.
*G02B 27/28* (2006.01)

(52) U.S. Cl.
CPC .................................. *G02B 27/283* (2013.01)

(58) Field of Classification Search
CPC ...... G02B 27/283; G02B 5/30; G02B 5/3025; G02B 5/3033; G02B 5/3058; G02B 5/3083; G02B 27/28; G02B 27/286; G02B 27/01; G02B 27/0101; G02B 27/017
USPC ............ 359/489.07, 183.01, 485.01, 485.05, 359/487.01, 487.03, 489.01, 489.08, 359/489.09, 489.11, 489.14, 489.15, 359/489.16, 489.18; 362/19; 353/20
See application file for complete search history.

(56) References Cited

U.S. PATENT DOCUMENTS

| | | | | |
|---|---|---|---|---|
| 10,012,938 | B2 | 7/2018 | Miyajima | |
| 10,054,790 | B2 | 8/2018 | Miyajima | |
| 2016/0202393 | A1 | 7/2016 | Miyajima | |
| 2019/0094519 | A1* | 3/2019 | Komatsu | G02B 5/0221 |
| 2023/0244065 | A1 | 8/2023 | Kobayashi | |
| 2023/0384594 | A1* | 11/2023 | Hong | G02F 1/133536 |
| 2024/0210676 | A1 | 6/2024 | Kobayashi | |
| 2024/0210700 | A1 | 6/2024 | Miyajima | |
| 2024/0248300 | A1 | 7/2024 | Yarita | |

FOREIGN PATENT DOCUMENTS

| | | | |
|---|---|---|---|
| JP | H08-110492 | A | 4/1996 |
| JP | 2019-503514 | A | 2/2019 |
| JP | 2019-053152 | A | 4/2019 |
| JP | 2020-515903 | A | 5/2020 |

* cited by examiner

*Primary Examiner* — Arnel C Lavarias
(74) *Attorney, Agent, or Firm* — Carter, DeLuca & Farrell LLP

(57) ABSTRACT

An optical system is configured to guide a light beam from a display surface to a pupil surface, and includes, in order from a pupil surface side to a display surface side, a first lens having a first transmissive reflective surface on the display surface side, a second lens, and a third lens having a second transmissive reflective surface on the pupil surface side. A quarter waveplate is provided to a surface on the pupil surface side of the second lens. The second lens and the third lens are spaced apart from each other.

13 Claims, 11 Drawing Sheets

OPTICAL SYSTEM INCLUDING TRANSMISSIVE REFLECTIVE SURFACE AND DISPLAY APPARATUS INCLUDING OPTICAL SYSTEM

TECHNICAL FIELD

One of the aspects of the embodiments relates to an optical system and a display apparatus.

DESCRIPTION OF RELATED ART

A display apparatus (observation apparatus) such as a head mount display (HMD) is known which provides a realistic experience by enlarging an original image displayed using an image display element through an observation optical system and enabling the user to view it. Since this type of display apparatus is worn on the user's head, the observation optical system is demanded to have a wide field of view, high optical performance, and a small (thin) size. PCT International Domestic Publication No. 2019-503514 discloses an observation optical system (folding optical system, reflective eyepiece) that uses a reflective surface to reduce the overall optical length.

The optical system disclosed in PCT International Publication No. 2019-503514 includes a single lens, so it is difficult to improve image quality.

SUMMARY

An optical system according to one aspect of the embodiment is configured to guide a light beam from a display surface to a pupil surface. The optical system includes, in order from a pupil surface side to a display surface side, a first lens having a first transmissive reflective surface on the display surface side, a second lens, and a third lens having a second transmissive reflective surface on the pupil surface side. A quarter waveplate is provided to a surface on the pupil surface side of the second lens. The second lens and the third lens are spaced apart from each other. The light beam from the display surface transmits through the third lens and the second lens in this order, is reflected by the first transmissive reflective surface toward the display surface, transmits through the second lens, and is reflected toward the pupil surface by the second transmissive reflective surface, transmits through the second lens and the first lens in this order, and enters the pupil surface in this order. A display apparatus including the above optical system also constitutes another aspect of the embodiment.

Further features of the disclosure will become apparent from the following description of embodiments with reference to the attached drawings.

DESCRIPTION OF THE EMBODIMENTS

Figure 1:
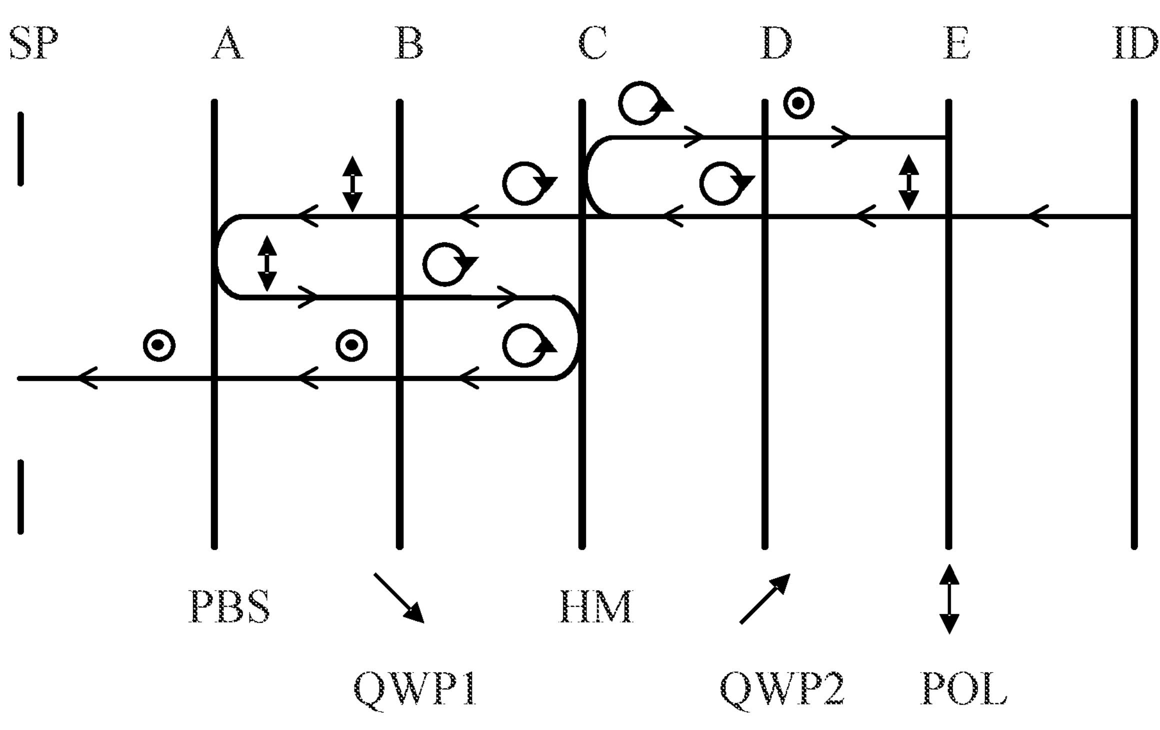
FIG. 1 is a schematic diagram illustrating an optical path of an optical system.

Referring now to the accompanying drawings, a detailed description will be given of embodiments according to the disclosure.

An optical system according to each example is an optical system configured to guide a light beam from a display surface (or plane) ID of a display element (or device) to a pupil surface (or plane) SP, and is an observation optical system configured to enable a user to observe an image displayed on the display surface ID. A display apparatus includes the optical system according to each example and a display element. The optical system according to each example includes, in order from the pupil surface side (observation side) to the display surface side, a first lens L1, a second lens L2, and a third lens L3. A surface on the display surface side of the first lens L1 is a first transmissive reflective surface HM1. A surface on the pupil surface side of the second lens L2 is a quarter waveplate QWP. A surface on the pupil surface side of the third lens L3 is a second transmissive reflective surface HM2. The light beam from the display element transmits through the third lens L3 and the second lens L2 in this order, is reflected by the first transmissive reflective surface HM1 toward the display surface, transmits through the second lens L2, is reflected by the second transmissive reflective surface HM2 toward the pupil surface, transmits through the second lens L2, transmits through the first lens L1, and enters the pupil surface SP.

Thus, by placing the first transmissive reflective surface HM1 on the display surface side of the first lens L1 and the second transmissive reflective surface HM2 on the observation side of the third lens L3, each of the first lens L1 and the third lens L3 is not placed between two reflective surfaces. This configuration can prevent light leakage due to birefringence of the first lens L1 and the third lens L3, and can provide an observation optical system with high optical performance. Moreover, by placing the second lens L2 between the two reflective surfaces, the second lens L2 can act on the light beam three times. Therefore, high magnification can be obtained while the overall length is kept short.

Now assume that Lref is a distance on the optical axis between the first transmissive reflective surface and the second transmissive reflective surface (air converted, optical path length), and L is a distance on the optical axis from the optical surface closest to the pupil surface SP in the optical system to the display surface ID (overall optical path length on the optical axis excluding an eye relief of the optical system). Then, the following inequality (1) may be satisfied in each example:

$$0.25 \leq Lref/L \leq 1.00 \quad (1)$$

Since the light transmits through the transmissive reflective surface three times, the distance Lref is the sum of the optical paths for all three transmits. By definition, the value never becomes higher than the upper limit of inequality (1). On the other hand, in a case where the value becomes lower than the lower limit of inequality (1), the folding distance becomes short and the overall length of the optical system becomes long. In a case where the overall length of the optical system becomes long, the weight increases and the center of gravity of the observation apparatus (display apparatus) moves away from the user, which increases the burden felt by the user.

Assume that d2*a* is a thickness on the optical axis of the second lens, d2*b* is a thickness of the second lens at a position that is separated by 15 mm from the optical axis in the direction orthogonal to the optical axis, and d2*c* is a thickness of the second lens at a position corresponding to 80% of the effective radius (effective diameter) on a surface on the pupil side of the second lens. The "effective diameter" is a diameter through which effective rays contributing to imaging transmit through an optical surface. At this time, at least one of the following inequalities (2) and (3) may be satisfied in each example:

$$0.25 \le d2b/d2a \le 0.80 \quad (2)$$

$$0.25 \le d2c/d2a \le 0.80 \quad (3)$$

In a case where the value becomes lower than the lower limit of inequality (2) or (3), the refractive power of the second lens becomes too large, and aberrations become significant. On the other hand, in a case where the value becomes higher than the upper limit of inequality (2) or (3), the refractive power of the second lens becomes too small and the overall length cannot be sufficiently short. That is, the second lens having proper refractive power and placed at a position where the light beam transmits through three times and is significantly affected can effectively reduce the overall length.

In the optical system according to each example, the following inequality (4) may be satisfied:

$$30 \le v2 \le 97 \quad (4)$$

where v2 is an Abbe number of the second lens based on the d-line.

In a case where the value becomes lower than the lower limit of inequality (4), the lateral chromatic aberration becomes large, and the image quality becomes lower in the peripheral area. On the other hand, in a case where the value becomes higher than the upper limit of inequality (4), the scattering of the material increases or the material becomes brittle.

The following inequality (5) may be satisfied in the optical system according to each example:

$$0.0 \le \text{maxsag} \le 2.0 \quad (5)$$

where maxsag (mm) is a distance in the optical axis direction from the position closest to the pupil surface to the position closest to the display surface among the effective area of the first transmissive reflective surface.

By definition, the value never becomes lower than the lower limit of inequality (5). On the other hand, in a case where the value becomes higher than the upper limit of inequality (5), it becomes difficult to form or attach a reflective surface. In particular, in forming or pasting a polarized-light reflective element on the display surface side of the first lens, inequality (5) may be satisfied.

The following inequality (6) may be satisfied in the optical system according to each example:

$$0.5 \le \text{abs}(rm2/\Phi m2) \le 1.5 \quad (6)$$

where rm2 is a radius of curvature of the transmissive reflective surface on an observation surface of the third lens, and Φm2 is an effective diameter.

In inequality (6), abs(x) represents the absolute value of x. In a case where the value becomes lower than the lower limit of inequality (6), the reflective power of the transmissive reflective surface on the observation side of the third lens becomes too large, the eye relief becomes short, and for example, the user's eyelashes may come into contact with the first lens. On the other hand, in a case where the value becomes higher than the upper limit of inequality (6), the reflective power of the transmissive reflective surface on the observation side of the third lens becomes too small, the magnification cannot be sufficiently increased, and realistic feeling becomes poor during use.

In each example, at least one of inequalities (1) to (6) may be replaced with inequalities (1a) to (6a) below:

$$0.40 \le Lref/L \le 0.92 \quad (1a)$$

$$0.30 \le d2b/d2a \le 0.78 \quad (2a)$$

$$0.30 \le d2c/d2a \le 0.75 \quad (3a)$$

$$35 \le v2 \le 97 \quad (4a)$$

$$0.0 \le \text{maxsag} \le 1.5 \quad (5a)$$

$$0.6 \le \text{abs}(rm2/\Phi m2) \le 1.5 \quad (6a)$$

In each example, at least one of inequalities (1) to (6) may be replaced with inequalities (1b) to (6b) below:

$$0.55 \le Lref/L \le 0.92 \quad (1b)$$

$$0.35 \le d2b/d2a \le 0.75 \quad (2b)$$

$$0.35 \le d2c/d2a \le 0.70 \quad (3b)$$

$$40 \le v2 \le 96 \quad (4b)$$

$$0.0 \le \text{maxsag} \le 1.0 \quad (5b)$$

$$0.7 \le \text{abs}(rm2/\Phi m2) \le 15 \quad (6b)$$

In the optical system according to each example, an air gap may be provided between the second lens and the third lens (the second lens and the third lens are spaced apart from each other). That is, the second lens and the third lens may not be cemented. In the optical system according to each example, inner focusing and diopter adjustment can be performed by moving the second lens, the third lens, or both in the optical axis direction. In performing inner focusing and diopter adjustment, the second lens and third lens are separated, and by moving only one of the second lens and the third lens, the weight of the focus unit can be reduced. Inner focusing can suppress magnification fluctuations during focusing and diopter adjustment. A small magnification change may be made in moving the focus unit in accordance with the movement of the user's line of sight or an object to be displayed to achieve a sense of depth.

In the optical system according to each example, the first transmissive reflective surface and the quarter waveplate may not be joined. By dispersing and arranging elements that are difficult to manufacture in this way, the degree of manufacturing difficulty can be lowered. For the same reason, the second transmissive reflective surface and the quarter waveplate may not be joined.

In the optical system according to each example, only one of the first transmissive reflective surface or the second transmissive reflective surface may be a reflective polarizer. The reflective polarizer may include a plurality of convex portions made of metal or dielectric (linear or band-shaped convex portions), and the array pitch of the plurality of convex portions may be 200 nm or less. The reflective polarizer may be integrally molded with the first lens L1 or the third lens L3. Due to this configuration, the lens and the transmissive reflective surface are not separately prepared, and the lens can be manufactured at a low cost. In this case, deterioration of image quality can be prevented because fine distortions in attaching the film to the curved surface of the lens will not occur. Aluminum can be used as the metal formed into a line or band shape, for example. This polarization-selective transmissive reflective element can be considered a type of wire grid polarizer. The structure of the wire grid is not limited to the above structure, and various element forms can be used as long as it functions as a polarization-selective transmissive reflective element.

In the optical system according to each example, a diffractive optical element may be placed on the observation side of the first lens (a surface on the observation side of the first lens may be a diffractive surface). Thereby, lateral chromatic aberration can be corrected and high image quality can be achieved. In the optical system according to each example, a surface on the observation side of the second lens may be a flat surface. Thereby, the quarter waveplate can be easily bonded to the surface on the observation side of the second lens, and the manufacturing of the optical system can be facilitated. In the optical system according to each example, the surface on the display surface side of the first lens has an inflection point. Thereby, while spherical aberration is corrected with the reflective surface on the third lens and the negative reflective power on the optical axis, the outer diameter can be kept small by the positive reflective power off the optical axis. In the optical system according to each example, a half angle of view may be 35° or more. Thereby, the user can acquire higher realistic feeling.

In each example, overall length OAL of the optical system may be 40 mm or less. Here, the overall length OAL is a distance from the optical surface closest to the pupil excluding the pupil surface SP (the surface on the pupil surface SP side of the first lens L1) to the display (the display surface ID of the display element). In a case where the overall length OAL becomes longer than 40 mm, it becomes inconvenient in a case where the optical system is mounted on a HMD or the like and worn on the head. In addition, in a case where a camera is attached to a front surface of the HMD to image the outside world and to display the image on the display unit, the parallax increases and the user is likely to feel sick or uncomfortable. The overall length OAL may be set to 30 mm or less or 25 mm or less. In the optical system according to each example, a diffractive optical element may be disposed on the pupil side of the first lens. Thereby, lateral chromatic aberration of the optical system can be effectively corrected.

As will be described below, a polarization-selective transmissive reflective element may be used as the first transmissive reflective surface HM1. One example of the polarization-selective transmissive reflective element is known as product name "WGF" manufactured by Asahi Kasei Corporation. Such a film-shaped polarizing element can be applied to a curved surface, but forming it in a flat or nearly flat shape can reduce the risk of misalignment in an axial direction, surface shape changes, and poor appearance due to stress of the film curvature.

In the optical system according to each example, the following configuration 1 or 2 can suppress light amount decrease of the regular observation optical path, and reduce ghost light (unnecessary light leakage) from the optical path that transmits through the transmissive reflective surface without being reflected even once.

Configuration 1 Utilizing Polarization

Referring now to FIG. 1, a description will be given of a configuration utilizing polarization. The optical system with this configuration has two transmissive reflective surfaces. Here, the transmissive reflective surface disposed on the observation side of the optical system according to this configuration includes polarization-selective transmissive reflective element (PBS) A. The polarization-selective transmissive reflective element (PBS) is a polarizer (reflective polarizer) configured to separate (split) incident light into reflected light and transmitting light according to the polarization state. The transmissive reflective surface disposed on the display element side of the optical system according to this configuration includes half-mirror (HM) C. First quarter waveplate (QWP1) B is placed between the polarization-selective transmissive reflective element PBS and the half-mirror HM. Second quarter waveplate (QWP2) D and linear polarizing plate (POL) E are disposed between the half-mirror HM and the display surface ID.

Here, the polarization-selective transmissive reflective element A is an element configured to reflect linearly polarized light polarized in the same direction as that when transmitting through the linear polarizing plate E, and transmit linearly polarized light orthogonal to this direction. The polarization-selective transmissive reflective element is, for example, a wire grid polarizer or a reflective polarizer having a layered structure of retardation films. At this time, the wire grid forming surface or the retardation film surface of the polarization-selective transmissive reflective element A functions as a transmissive reflective surface. The wire grid polarizer does not necessarily have to be made of aligned metal wires, but can be anything that has thin metal or dielectric layers at predetermined intervals and functions as a polarization-selective transmissive reflective element. For example, an element with aligned metal or dielectric layers as described above can be used.

The first quarter waveplate B and the second quarter waveplate D are arranged with their slow axes tilted by 45 degrees relative to the polarization transmission axis of the linear polarizing plate E. Here, the first quarter waveplate B and the second quarter waveplate D may be disposed with their respective slow axes tilted by 90 degrees. This arrangement can cancel out the wavelength dispersion characteristics of these waveplates in a case where a light beam transmits through the first quarter waveplate B and the second quarter waveplate D. The half-mirror C is a half-mirror formed, for example, by a dielectric multilayer film or metal vapor deposition, and functions as a transmissive reflective surface. The linear polarizing plate E is, for example, an absorption type linear polarizer.

A description will now be given of the optical path selection and operation in the configuration utilizing polarization. The light emitted from the display surface ID becomes linearly polarized light by the linear polarizing plate E, becomes circularly polarized light by the second quarter waveplate D, and enters the half-mirror C. Part of the light that reaches the half-mirror C is reflected, becomes circularly polarized light in the opposite direction, and returns to the second quarter waveplate D. The circularly polarized light in the opposite direction that has returned to the second quarter waveplate D returns to the linear polarizing plate E as linearly polarized light polarized by the second quarter waveplate D in a direction orthogonal to that when first transmitting through the linear polarizer E and is absorbed by the linear polarizing plate E. On the other hand, part of the light that reaches the half-mirror C transmits through the half-mirror C and becomes linearly polarized light by the first quarter waveplate B in the same direction as that when transmitting through the linear polarizing plate E, and enters the polarization-selective transmissive reflective element A.

Here, due to the polarization selectivity of the polarization-selective transmissive reflective element A, the linearly polarized light polarized in the same direction as that when transmitting through the linear polarizing plate E is reflected. The light reflected by the polarization-selective transmissive reflective element A becomes circularly polarized light in the same as that when it first became circularly polarized light by the second quarter waveplate D and the first quarter waveplate B, and enters the half-mirror C. The light reflected by the half-mirror C becomes circularly polarized light in the opposite direction to that of the pre-reflection light, enters the first quarter waveplate B, becomes linearly polarized light polarized in a direction orthogonal to that when it first transmits through the linear polarizing plate E, and enters the polarization-selective transmissive reflective element A. Here, due to the polarization selectivity of the polarization-selective transmissive reflective element A, linearly polarized light polarized in a direction orthogonal to that when transmitting through the linear polarizing plate E transmits through it and is guided to the pupil surface SP.

Due to the above actions, only the light that has transmitted through the half-mirror HM, been reflected by the polarization-selective transmissive reflective element PBS, been reflected by the half-mirror HM, and transmitted through the polarization-selective transmissive reflective element PBS is guided to the pupil surface SP.

Configuration 2 Utilizing Polarization

Figure 2:
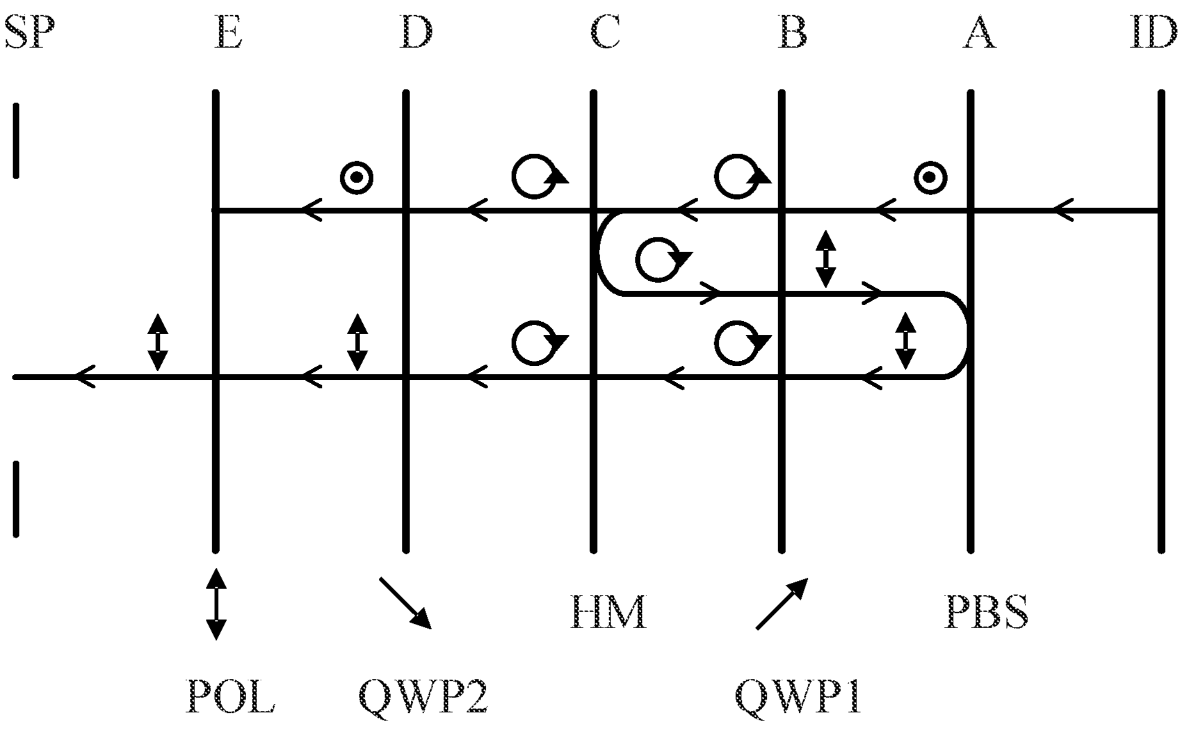
FIG. 2 is a schematic diagram illustrating an optical path of an optical system.

Referring now to FIG. 2, a description will be given of a configuration utilizing polarization. The optical system with this configuration has two transmissive reflective surfaces. Here, the transmissive reflective surface disposed on the observation side of the optical system according to this configuration includes a half-mirror (HM) C. The transmissive reflective surface disposed on the display element side of the optical system according to this configuration includes a polarization-selective transmissive reflective element (PBS) A. A first quarter waveplate (QWP1) B is disposed between the polarization-selective transmissive reflective element PBS and the half-mirror HM. A linear polarizing plate (POL) E and a second quarter waveplate (QWP2) D are disposed between the half-mirror HM and the pupil surface SP. In this configuration, the configuration of each polarizing element and the arrangement of the optical axis direction are the same as those of configuration 1 described above.

A description will now be given of the optical path selection and operation in the configuration utilizing polarization. Due to the polarization-selective transmissive reflective element A, the light emitted from the display surface ID becomes linearly polarized light polarized in a direction orthogonal to the transmission axis of the linear polarizing plate E, and transmits through the polarization-selective transmissive reflective element A. The light that has transmitted through the polarization-selective transmissive reflective element A becomes circularly polarized light by the first quarter waveplate B, and enters the half-mirror C. Part of the light that reaches the half-mirror C transmits through it and enters the second quarter waveplate D. The circularly polarized light that has entered the second quarter waveplate D then enters the linear polarizing plate E as linearly polarized light polarized in a direction orthogonal to the transmission axis of the linear polarizing plate E by the second quarter waveplate D, and is absorbed by the linear polarizing plate E. On the other hand, part of the light that has reached the half-mirror C is reflected, becomes circularly polarized light in the opposite direction, and returns to the first quarter waveplate B. The circularly polarized light in the opposite direction that has returned to the first quarter waveplate B becomes linearly polarized light polarized in a direction parallel to the transmission axis of the linear polarizer E by the first quarter waveplate B, and enters the polarization-selective transmissive reflective element A.

Here, due to the polarization selectivity of the polarization-selective transmissive reflective element A, the linearly polarized light polarized in a direction parallel to the transmission axis of the linear polarizing plate E is reflected. The light reflected by the polarization-selective transmissive reflective element A becomes circularly polarized light in the opposite direction to the circularly polarized light produced by the first quarter waveplate B, and enters the half-mirror C. Here, the light that has transmitted through the half-mirror C enters the second quarter waveplate D, becomes linearly polarized light polarized in a direction parallel to the transmission axis of the linear polarizing plate E, transmits through the linear polarizing plate E, and is guided to the pupil surface SP.

Due to the above actions, only the light that has transmitted through the polarization-selective transmissive reflective element PBS, been reflected by the half-mirror HM, been reflected by the polarization-selective transmissive reflective element PBS, and transmitted through the half-mirror HM is guided to the pupil surface SP.

A description will now be given of the configuration of the optical system according to each example.

Example 1

Figure 3:
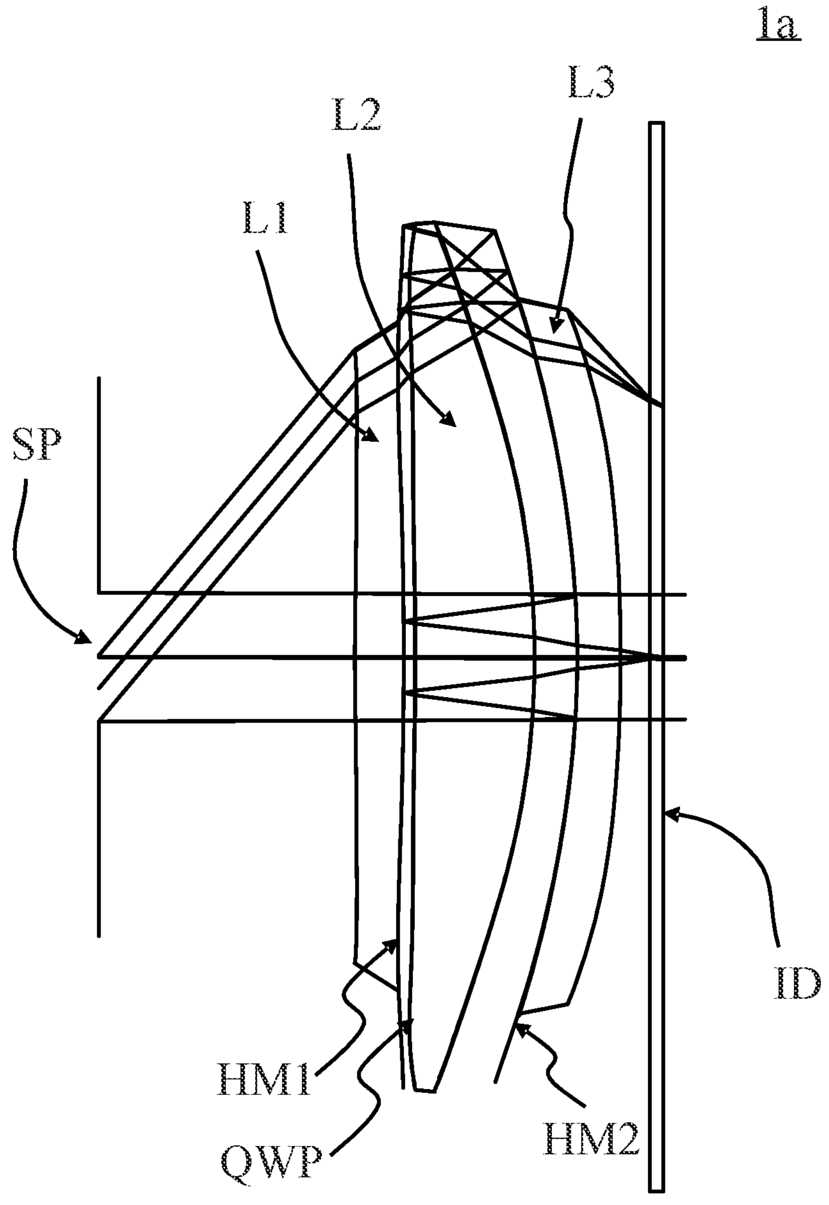
FIG. 3 is a sectional view of an optical system according to Example 1.
Figure 4:
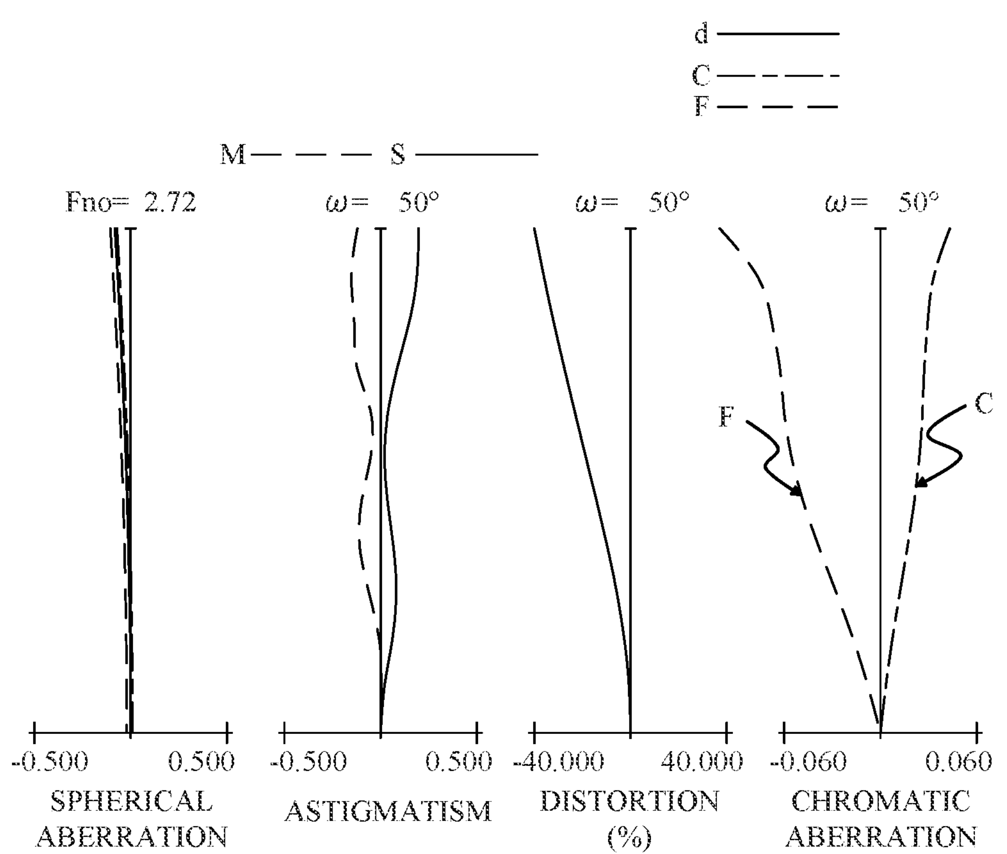
FIG. 4 is an aberration diagram of the optical system according to Example 1.

Referring now to FIGS. 3 and 4, a description will be given of an optical system (observation optical system) 1*a* according to Example 1. FIG. 3 is a sectional view of the optical system 1*a*. FIG. 4 is an aberration diagram of the optical system 1*a* for the wavelengths of the d-line, F-line, and C-line in a case where an eye relief is 12 mm and a virtual image is displayed at a position distant by 1612 mm from the pupil surface SP.

The optical system 1*a* includes, in order from the pupil surface SP side (observation side) to the display surface ID side of the display element, a first lens L1 having a first transmissive reflective surface HM1, a second lens L2, and a third lens L3 having a second transmissive reflective surface HM2 on the observation surface side. The second lens L2 has a quarter waveplate QWP on the observation surface side. The optical system 1*a* is capable of inner focusing and diopter adjustment by moving the third lens L3 in the optical axis direction. For example, in displaying a virtual image at a position distant by −222 mm from the pupil, the distance between the second lens L2 and the third lens L3 is set to 1.00 mm. In displaying a virtual image at a position distant by 978 mm from the pupil surface SP, the distance between the second lens L2 and the third lens L3 is set to 2.34 mm. At this time, the distance between the display (display element) and the second lens L2 does not change.

Example 2

Figure 5:
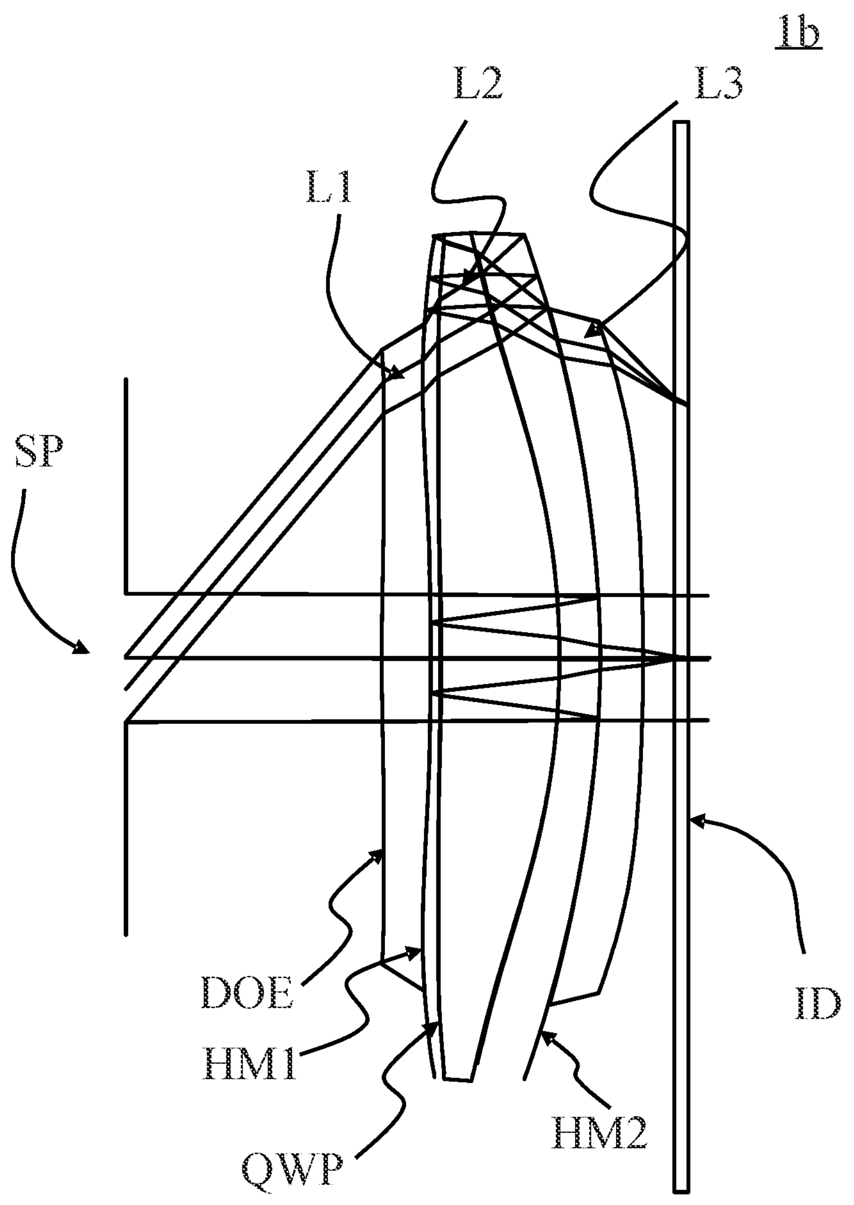
FIG. 5 is a sectional view of an optical system according to Example 2.
Figure 6:
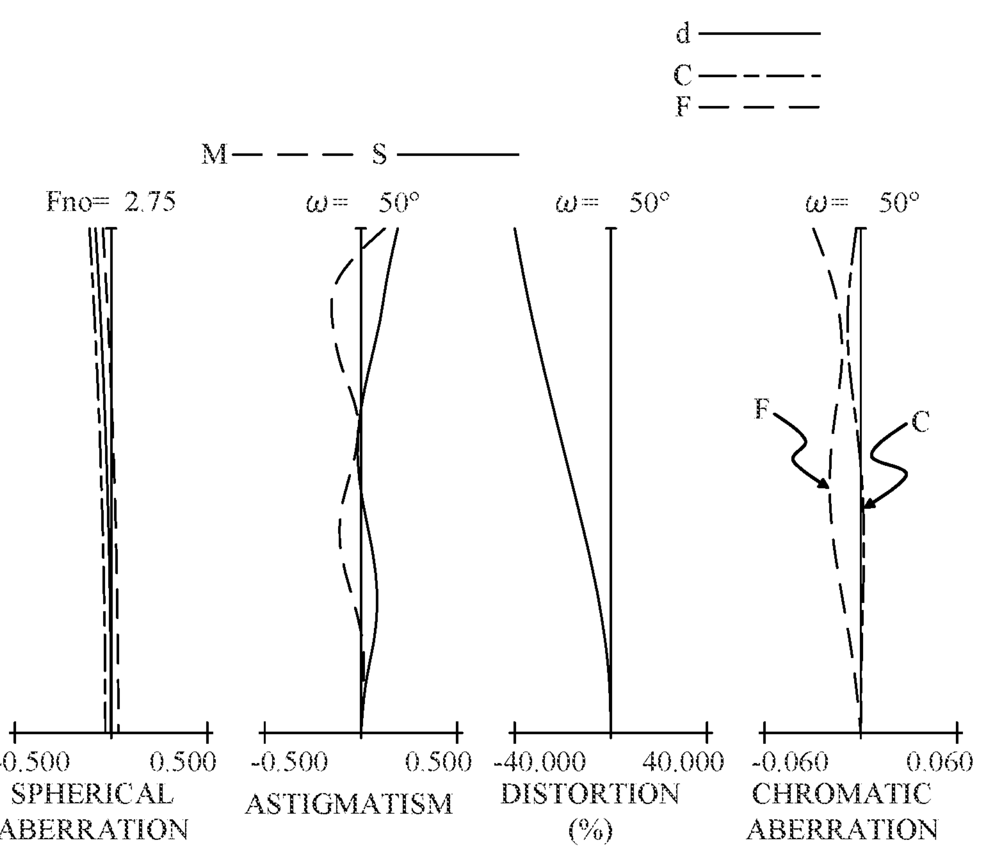
FIG. 6 is an aberration diagram of the optical system according to Example 2.

Referring now to FIGS. 5 and 6, a description will be given of an optical system (observation optical system) 1*b* according to Example 2. FIG. 5 is a sectional view of the optical system 1*b*. FIG. 6 is an aberration diagram of the optical system 1*b* for the wavelengths of the d-line, F-line, and C-line in a case where an eye relief is 12 mm and a virtual image is displayed at a position distant by 1612 mm from the pupil surface SP.

The optical system 1*b* includes, in order from the pupil surface SP side (observation side) to the display surface ID side of the display element, a first lens L1 having a first transmissive reflective surface HM1, a second lens L2, and a third lens L3 having a second transmissive reflective surface HM2 on the observation surface side. The first lens L1 has a diffractive optical element DOE on the observation surface side. The second lens L2 has a quarter waveplate QWP on the observation surface side. The optical system 1*b* is capable of inner focusing and diopter adjustment by moving the third lens L3 in the optical axis direction.

Example 3

Figure 7:
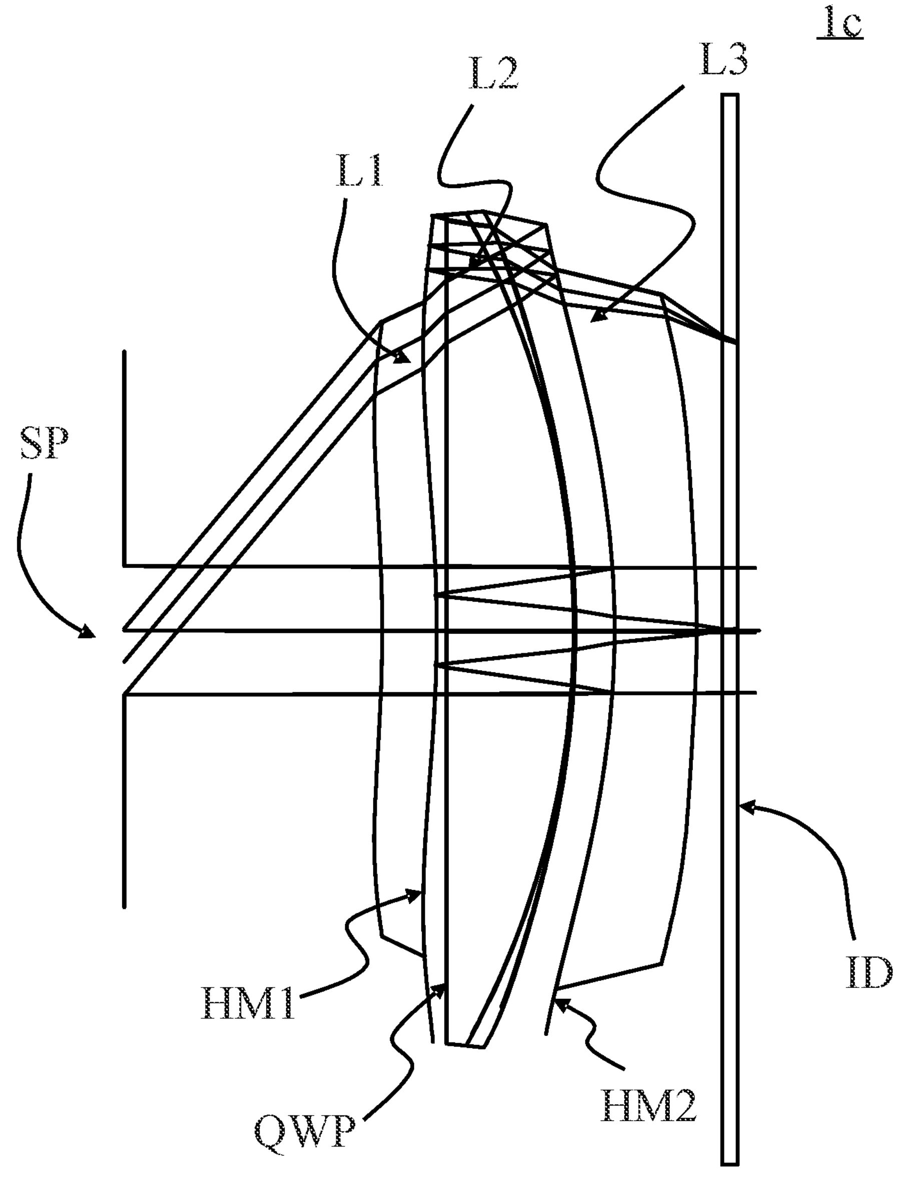
FIG. 7 is a sectional view of an optical system according to Example 3.
Figure 8:
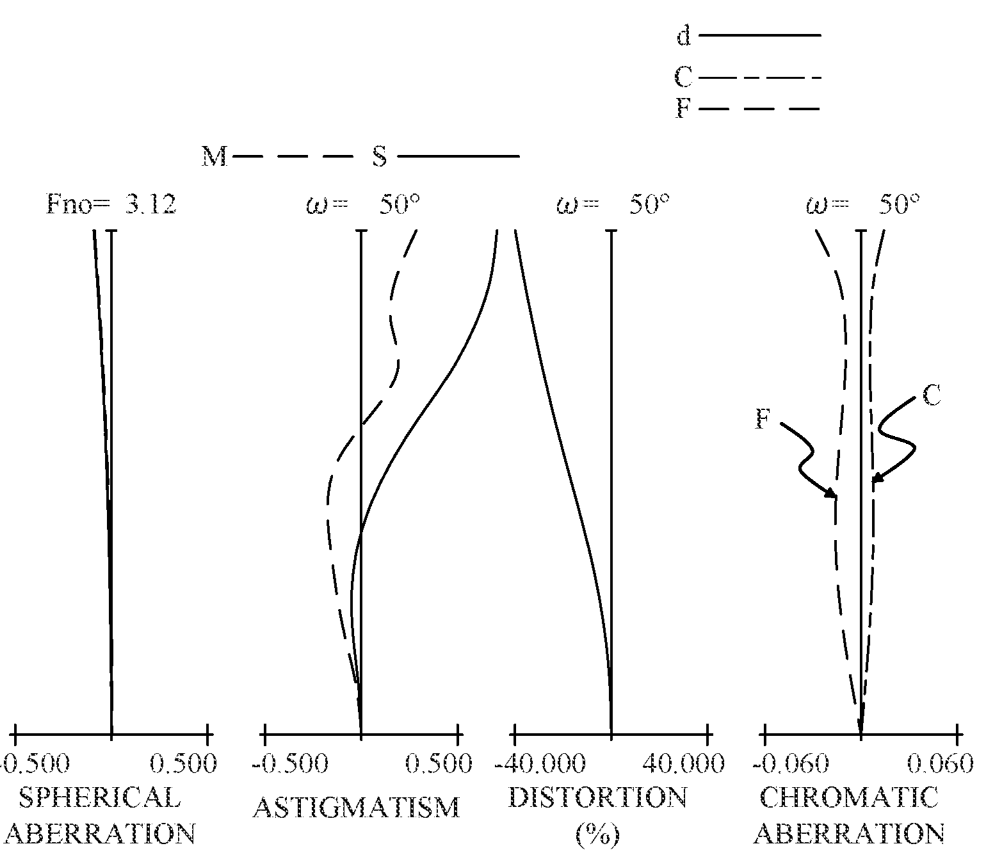
FIG. 8 is an aberration diagram of the optical system according to Example 3.

Referring now to FIGS. 7 and 8, a description will be given of an optical system (observation optical system) 1*c* according to Example 3. FIG. 7 is a sectional view of the optical system 1*c*. FIG. 8 is an aberration diagram of the optical system 1*c* for the wavelengths of the d-line, F-line, and C-line when an eye relief is 12 mm and a virtual image is displayed at a position distant by 1612 mm from the pupil surface SP.

The optical system 1*c* includes, in order from the pupil surface SP side (observation side) to the display surface ID side of the display element, a first lens L1 having a first transmissive reflective surface HM1, a second lens L2, and a third lens L3 having a second transmissive reflective surface HM2 on the observation surface side. The second lens L2 has a quarter waveplate QWP on the observation surface side. The second lens L2 is S-FPL51 manufactured by Ohara Co., Ltd., and resin is molded on its surface. A quarter waveplate is provided on the observation side of the second lens L2. The optical system 1*c* is capable of inner focusing and diopter adjustment by moving the third lens L3 in the optical axis direction.

Example 4

Figure 9:
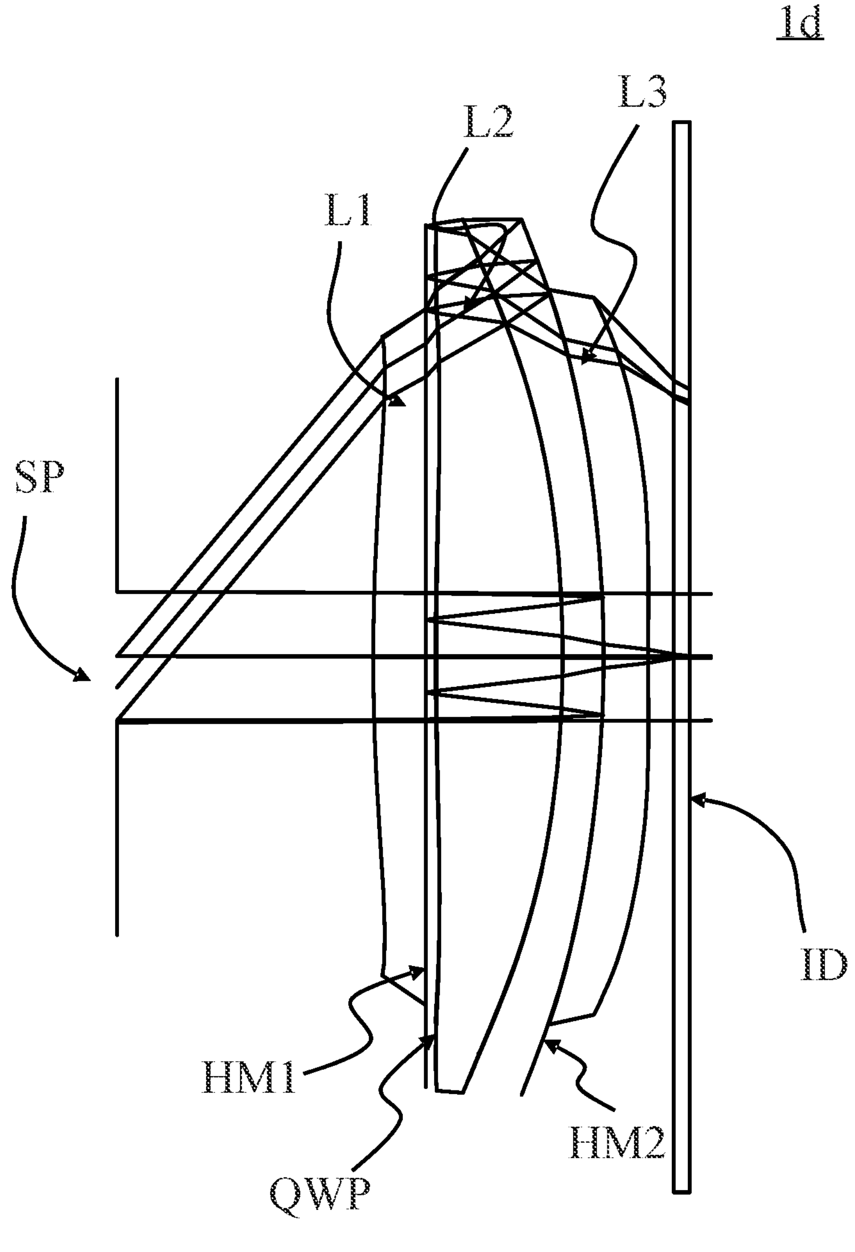
FIG. 9 is a sectional view of an optical system according to Example 4.
Figure 10:
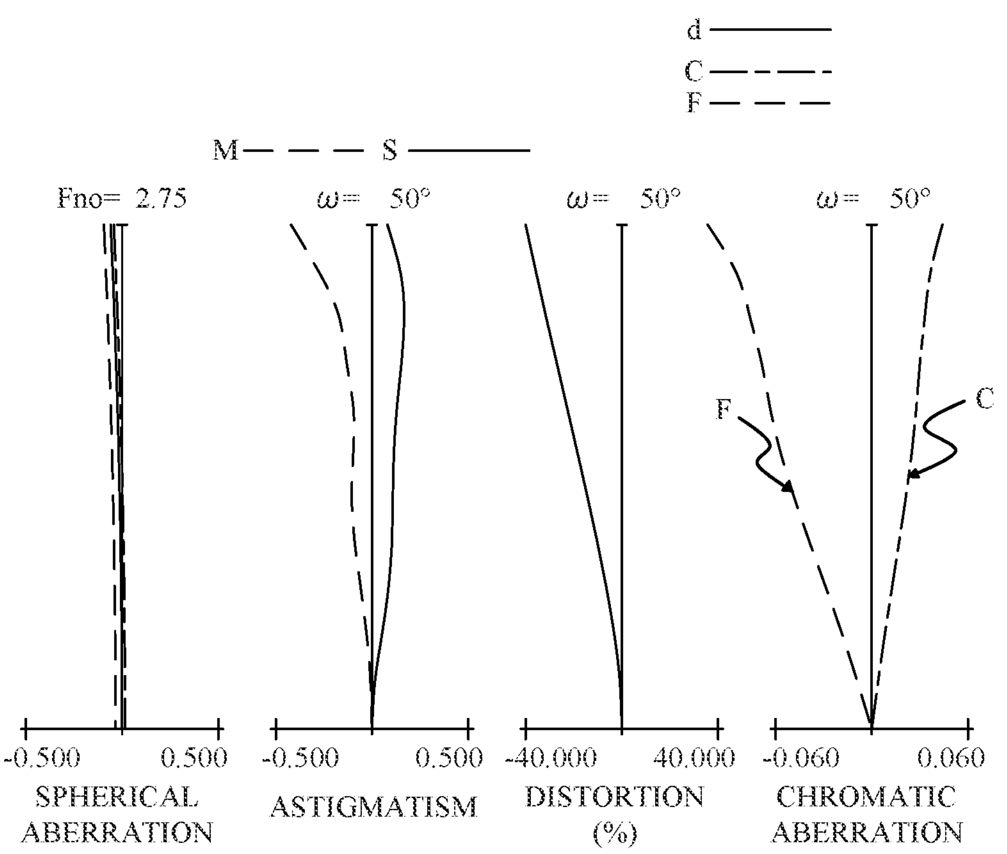
FIG. 10 is an aberration diagram of the optical system according to Example 4.

Referring now to FIGS. 9 and 10, a description will be given of an optical system (observation optical system) 1*d* according to Example 4. FIG. 9 is a sectional view of the optical system 1*d*. FIG. 10 is an aberration diagram of the optical system 1*d* for the wavelengths of the d-line, F-line, and C-line in a case where an eye relief is 12 mm and a virtual image is displayed at a position distant by 1612 mm from the pupil surface SP.

The optical system 1*d* includes, in order from the pupil surface SP side (observation side) to the display surface ID side of the display element, a first lens L1 having a first transmissive reflective surface HM1, a second lens L2, and a third lens L3 having a second transmissive reflective surface HM2 on the observation surface side. The second lens L2 has a quarter waveplate QWP on the observation surface side. The optical system 1*d* is capable of inner focusing and diopter adjustment by moving the third lens L3 in the optical axis direction.

Example 5

Figure 11:
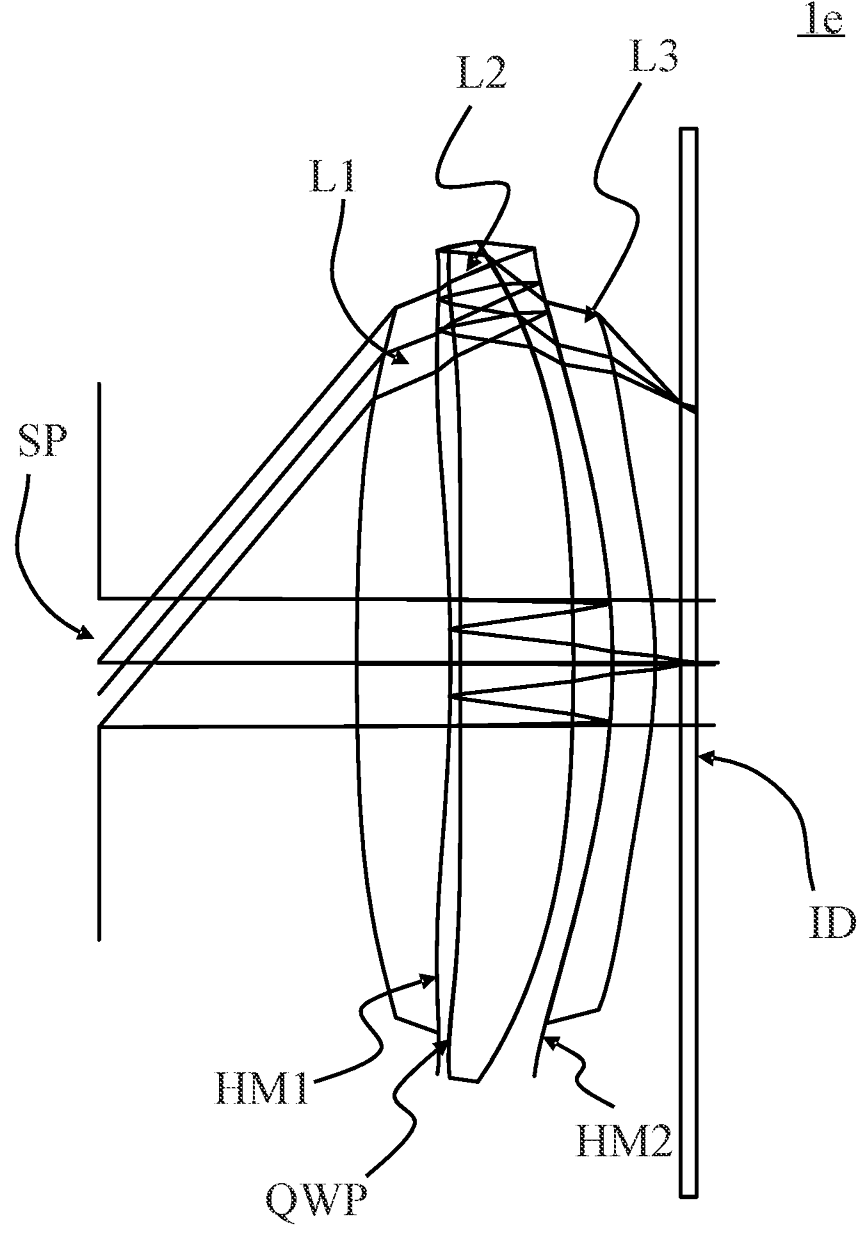
FIG. 11 is a sectional view of an optical system according to Example 5.
Figure 12:
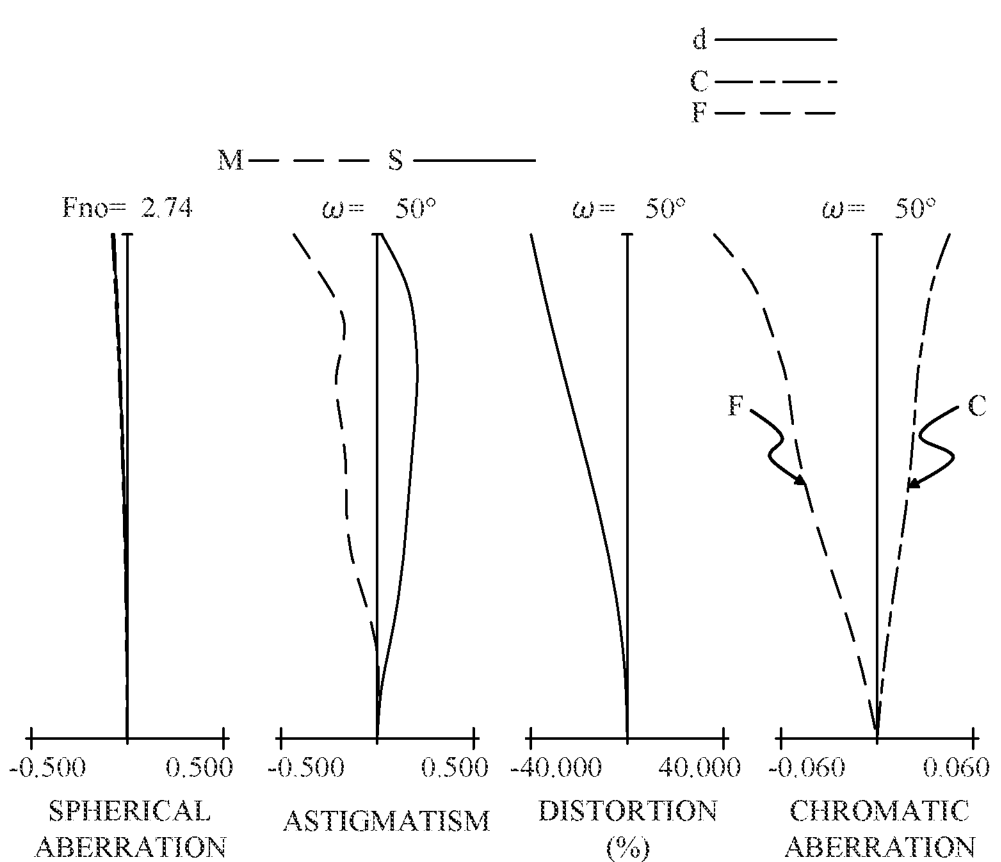
FIG. 12 is an aberration diagram of the optical system according to Example 5.

Referring now to FIGS. 11 and 12, a description will be given of an optical system (observation optical system) 1*e* according to Example 5. FIG. 11 is a sectional view of the optical system 1*e*. FIG. 12 is an aberration diagram of the optical system 1*e* for the wavelengths of the d-line, F-line, and C-line in a case where an eye relief is 12 mm and a virtual image is displayed at a position distant by 1612 mm from the pupil surface SP.

The optical system 1*e* includes, in order from the pupil surface SP side (observation side) to the display surface ID side of the display element, a first lens L1 having a first transmissive reflective surface HM1, a second lens L2, and a third lens L3 having a second transmissive reflective surface HM2 on the observation surface side. The second lens L2 has a quarter waveplate QWP on the observation surface side. The optical system 1*e* is capable of inner focusing and diopter adjustment by moving the third lens L3 in the optical axis direction.

A description will now be given of numerical examples 1 to 5 corresponding to Examples 1 to 5, respectively. In the surface data of each numerical example, a surface number i indicates an i-th surface when counted from the pupil surface side. r represents a radius of curvature of the i-th surface (mm), d represents a lens thickness or air gap (mm) between i-th and (i+1)-th surfaces, and nd represents a refractive index for the d-line of the material of the i-th optical member. νd represents an Abbe number of the material of the i-th optical element based on the d-line. The Abbe number νd of a certain material is expressed as follows:

$$\nu d = (Nd - 1)/(NF - NC)$$

where Nd, NF, and NC are refractive indices based on the d-line (587.6 nm), the F-line (486.1 nm), and the C-line (656.3 nm) in the Fraunhofer line, respectively. The effective diameter indicates a maximum diameter of an area through which light from an original image transmits on each surface.

In a case where the optical surface is aspherical, an asterisk * is attached to the right side of the surface number. The aspherical shape is expressed as follows:

$$x(h) = \frac{\left(\frac{h^2}{r}\right)}{1 + \sqrt{\left\{1 - (1+k)\left(\frac{h}{r}\right)^2\right\}}} + A_4h^4 + A_6h^6 + A_8h^8 + A_{10}h^{10} + \dots$$

where x is a displacement amount from a surface vertex in the optical axis direction, h is a height from the optical axis in a direction orthogonal to the optical axis, R is a paraxial radius of curvature, k is a conic constant, and Ai (where i=4, 6, 8, . . . ) are aspheric coefficients.

Various data include a focal length (mm), an F-number, a half angle of view (degrees), an image height (mm), etc. The overall lens length in the numerical examples is different from the overall length OAL of the optical system, and is the sum of the eye relief and the overall length OAL.

A phase shape of the diffractive optical element DOE is expressed as follows:

$$\psi\ (h,\ m) = (2\pi/m\lambda 0)(C1h2 + C2h4 + C3h6\ \ldots\ )$$

where a phase shape ψ (h, m) at a distance H in the radial direction from the optical axis, m is a diffraction order, λ0 is a reference wavelength (designed wavelength), and C2i is a phase coefficient of the 2i-order term.

At this time, the refractive power φ of the diffraction surface of the diffractive optical element for arbitrary wavelength Δ and arbitrary diffraction order m can be expressed as follows using the phase coefficient C1:

$$\varphi\ (\lambda,\ m) = -2C1m\lambda/\lambda 0$$

In each example, the diffraction order m of the diffracted light is set to 1. The reference wavelength λ0 is set to 530 nm.

Numerical Example 1

UNIT: mm

SURFACE DATA

| Surface No. | r | d | nd | νd | Effective Diameter |
|---|---|---|---|---|---|
| 1 (Pupil Surface) | ∞ | 12.000 | | | 6.00 |
| 2* | 183.0870 | 2.296 | 1.54390 | 56.0 | 28.70 |
| 3* | −212.4290 | 0.500 | | | 31.25 |
| 4* | −136.7761 | 5.591 | 1.54390 | 56.0 | 33.16 |
| 5* | −41.4643 | 1.966 | | | 35.95 |
| 6* | −44.5307 | −1.966 | | | 39.77 |
| 7* | −41.4643 | −5.591 | 1.54390 | 56.0 | 40.57 |
| 8* | −136.7761 | −0.500 | | | 40.46 |
| 9* | −212.4290 | 0.500 | | | 40.21 |
| 10* | −136.7761 | 5.591 | 1.54390 | 56.0 | 39.97 |
| 11* | −41.4643 | 1.966 | | | 39.47 |
| 12* | −44.5307 | 2.000 | 1.63550 | 23.9 | 33.46 |
| 13* | −81.8349 | 1.370 | | | 32.39 |
| 14 | ∞ | 0.700 | 1.51633 | 64.1 | 50.00 |
| 15 | ∞ | 0.000 | | | 50.00 |
| Image Plane | ∞ | | | | |

ASPHERIC DATA

2nd Surface

K = 0.00000e+00, A4 = −3.50095e−05, A6 = 1.59497e−07, A8 = 2.07493e−10, A10 = −2.98973e−12, A12 = 3.43917e−15

3rd Surface

K = 0.00000e+00, A4 = −1.41385e−05, A6 = 1.42264e−07, A8 = −3.40877e−10, A10 = 3.45648e−13, A12 = −1.83016e−16

-continued

UNIT: mm

4th Surface

K = 0.00000e+00, A4 = 4.67099e−05, A6 = −2.70059e−07, A8 = 6.22218e−10, A10 = −4.57546e−13

5th Surface

K = 0.00000e+00, A4 = −1.35542e−05, A6 = 7.99334e−08, A8 = −9.43175e−11

6th Surface

K = 0.00000e+00, A4 = 1.55888e−05, A6 = −5.26002e−08, A8 = 7.47960e−11, A10 = −1.42369e−14

7th Surface

K = 0.00000e+00, A4 = −1.35542e−05, A6 = 7.99334e−08, A8 = −9.43175e−11

8th Surface

K = 0.00000e+00, A4 = 4.67099e−05, A6 = −2.70059e−07, A8 = 6.22218e−10, A10 = −4.57546e−13

9th Surface

K = 0.00000e+00, A4 = −1.41385e−05, A6 = 1.42264e−07, A8 = −3.40877e−10, A10 = 3.45648e−13, A12 = −1.83016e−16

10th Surface

K = 0.00000e+00, A4 = 4.67099e−05, A6 = −2.70059e−07, A8 = 6.22218e−10, A10 = −4.57546e−13

11th Surface

K = 0.00000e+00, A4 = −1.35542e−05, A6 = 7.99334e−08, A8 = −9.43175e−11

12th Surface

K = 0.00000e+00, A4 = 1.55888e−05, A6 = −5.26002e−08, A8 = 7.47960e−11, A10 = −1.42369e−14

13th Surface

K = 0.00000e+00, A4 = 1.91392e−06, A6 = −1.64834e−07, A8 = 6.52840e−10, A10 = −8.57118e−13

| | |
|---|---|
| Focal Length | 16.336 |
| Fno | 2.723 |
| Half Angle of View | 50.022 |
| Image Height | 11.712 |
| Overall Lens Length | 42.537 |
| BF | 0.000 |
| Object Distance (from 1st Surface) | 1612.000 |

Single Lens Data

| Lens | Starting Surface | Focal Length |
|---|---|---|
| 1 | 1 | 181.166 |
| 2 | 4 | 107.185 |
| 3 | 7 | 107.185 |
| 4 | 10 | 107.185 |
| 5 | 12 | −156.989 |
| 6 | 14 | 0.000 |

Numerical Example 2

UNIT: mm

SURFACE DATA

| Surface No. | r | d | nd | νd | Effective Diameter |
|---|---|---|---|---|---|
| 1 (Pupil Surface) | ∞ | 12.000 | | | 6.00 |
| 2 (Diffraction) | 128.8162 | 2.249 | 1.54390 | 56.0 | 28.70 |
| 3* | −241.7193 | 0.500 | | | 31.18 |
| 4* | −93.0505 | 5.483 | 1.54390 | 56.0 | 33.34 |

-continued

| UNIT: mm | | | | | |
|---|---|---|---|---|---|
| 5* | −38.0353 | 1.997 | | | 35.80 |
| 6* | −46.1260 | −1.997 | | | 39.44 |
| 7* | −38.0353 | −5.483 | 1.54390 | 56.0 | 39.61 |
| 8* | −93.0505 | −0.500 | | | 39.44 |
| 9* | −241.7193 | 0.500 | | | 39.31 |
| 10* | −93.0505 | 5.483 | 1.54390 | 56.0 | 38.85 |
| 11* | −38.0353 | 1.997 | | | 37.89 |
| 12* | −46.1260 | 2.000 | 1.63550 | 23.9 | 32.50 |
| 13* | −92.1447 | 1.393 | | | 31.36 |
| 14 | ∞ | 0.700 | 1.51633 | 64.1 | 50.00 |
| 15 | ∞ | 0.000 | | | 50.00 |
| Image Plane | ∞ | | | | |

ASPHERIC DATA

2nd Surface

K = 0.00000e+00, A4 = −6.04490e−05, A6 = 3.79847e−07, A8 = −6.40429e−10, A10 = −1.72018e−12, A12 = 3.05627e−15

2nd Surface (Diffractive Surface)

C 2 = −5.67972e−04 C 4 = −2.71879e−06 C 6 = 6.98223e−09

3rd Surface

K = 0.00000e+00, A4 = −2.23612e−05, A6 = 2.28981e−07, A8 = −6.71334e−10, A10 = 8.08952e−13, A12 = −2.80051e−16

4th Surface

K = 0.00000e+00, A4 = 6.74150e−05, A6 = −3.99047e−07, A8 = 1.09719e−09, A10 = −1.07358e−12

5th Surface

K = 0.00000e+00, A4 = −1.15288e−05, A6 = 1.00206e−07, A8 = −1.15704e−10

6th Surface

K = 0.00000e+00, A4 = 1.77704e−05, A6 = −6.74246e−08, A8 = 1.34749e−10, A10 = −1.07340e−13

7th Surface

K = 0.00000e+00, A4 = −1.15288e−05, A6 = 1.00206e−07, A8 = −1.15704e−10

8th Surface

K = 0.00000e+00, A4 = 6.74150e−05, A6 = −3.99047e−07, A8 = 1.09719e−09, A10 = −1.07358e−12

9th Surface

K = 0.00000e+00, A4 = −2.23612e−05, A6 = 2.28981e−07, A8 = −6.71334e−10, A10 = 8.08952e−13, A12 = −2.80051e−16

10th Surface

K = 0.00000e+00, A4 = 6.74150e−05, A6 = −3.99047e−07, A8 = 1.09719e−09, A10 = −1.07358e−12

11th Surface

K = 0.00000e+00, A4 = −1.15288e−05, A6 = 1.00206e−07, A8 = −1.15704e−10

12th Surface

K = 0.00000e+00, A4 = 1.77704e−05, A6 = −6.74246e−08, A8 = 1.34749e−10, A10 = −1.07340e−13

13th Surface

K = 0.00000e+00, A4 = 2.46942e−05, A6 = −4.31361e−07, A8 = 1.66415e−09, A10 = −2.13339e−12

| | |
|---|---|
| Focal Length | 16.481 |
| Fno | 2.747 |
| Half Angle of View | 50.022 |
| Image Height | 11.792 |
| Overall Lens Length | 42.283 |
| BF | 0.000 |
| Object Distance (from 1st Surface) | 1612.000 |

-continued

UNIT: mm

Single Lens Data

| Lens | Starting Surface | Focal Length |
|---|---|---|
| 1 | 1 | 129.638 |
| 2 | 4 | 114.266 |
| 3 | 7 | 114.266 |
| 4 | 10 | 114.266 |
| 5 | 12 | −147.830 |
| 6 | 14 | 0.000 |

Numerical Example 3

UNIT: mm

SURFACE DATA

| Surface No. | r | d | nd | νd | Effective Diameter |
|---|---|---|---|---|---|
| 1 (Pupil Surface) | ∞ | 12.000 | | | 6.00 |
| 2* | −76.3494 | 2.565 | 1.54390 | 56.0 | 28.72 |
| 3* | −65.5323 | 0.500 | | | 30.58 |
| 4 | ∞ | 5.903 | 1.49700 | 81.5 | 32.63 |
| 5 | −40.5456 | 0.097 | 1.61263 | 38.0 | 34.72 |
| 6* | −44.0882 | 1.857 | | | 35.33 |
| 7* | −41.7965 | −1.857 | | | 37.79 |
| 8* | −44.0882 | −0.097 | 1.61263 | 38.0 | 39.06 |
| 9 | −40.5456 | −5.903 | 1.49700 | 81.5 | 38.90 |
| 10 | ∞ | −0.500 | | | 38.78 |
| 11* | −65.5323 | 0.500 | | | 38.64 |
| 12 | ∞ | 5.903 | 1.49700 | 81.5 | 38.30 |
| 13 | −40.5456 | 0.097 | 1.61263 | 38.0 | 37.91 |
| 14* | −44.0882 | 1.857 | | | 37.73 |
| 15* | −41.7965 | 3.801 | 1.63550 | 23.9 | 33.69 |
| 16* | −50.8197 | 1.254 | | | 31.31 |
| 17 | ∞ | 0.700 | 1.51633 | 64.1 | 50.00 |
| 18 | ∞ | 0.000 | | | 50.00 |
| Image Plane | ∞ | | | | |

ASPHERIC DATA

2nd Surface

K = 0.00000e+00, A4 = 1.98287e−05, A6 = 2.56283e−07, A8 = −1.69136e−09, A10 = 4.60491e−12, A12 = −5.02763e−15

3rd Surface

K = 0.00000e+00, A4 = 1.69047e−05, A6 = 1.09369e−07, A8 = −6.28688e−10, A10 = 1.46852e−12, A12 = −1.38692e−15

6th Surface

K = 0.00000e+00, A4 = −3.18183e−06, A6 = 3.04820e−08, A8 = 1.50908e−11, A10 = −1.58808e−13

7th Surface

K = 0.00000e+00, A4 = 6.21857e−06, A6 = 1.92097e−08, A8 = −5.39597e−11, A10 = 8.68679e−14

8th Surface

K = 0.00000e+00, A4 = −3.18183e−06, A6 = 3.04820e−08, A8 = 1.50908e−11, A10 = −1.58808e−13

11th Surface

K = 0.00000e+00, A4 = 1.69047e−05, A6 = 1.09369e−07, A8 = −6.28688e−10, A10 = 1.46852e−12, A12 = −1.38692e−15

14th Surface

K = 0.00000e+00, A4 = −3.18183e−06, A6 = 3.04820e−08, A8 = 1.50908e−11, A10 = −1.58808e−13

-continued

| UNIT: mm |
|---|
| 15th Surface |
| K = 0.00000e+00, A4 = 6.21857e−06, A6 = 1.92097e−08, A8 = −5.39597e−11, A10 = 8.68679e−14 |
| 16th Surface |
| K = 0.00000e+00, A4 = 1.15101e−04, A6 = −9.90802e−07, A8 = 3.36489e−09, A10 = −4.06773e−12 |

| | |
|---|---|
| Focal Length | 18.713 |
| Fno | 3.119 |
| Half Angle of View | 50.022 |
| Image Height | 13.433 |
| Overall Lens Length | 45.393 |
| BF | 0.000 |
| Object Distance (from 1st Surface) | 1612.000 |

Single Lens Data

| Lens | Starting Surface | Focal Length |
|---|---|---|
| 1 | 1 | 784.845 |
| 2 | 4 | 81.581 |
| 3 | 5 | −832.296 |
| 4 | 8 | −832.296 |
| 5 | 9 | 81.581 |
| 6 | 12 | 81.581 |
| 7 | 13 | −832.296 |
| 8 | 15 | −442.926 |
| 9 | 17 | 0.000 |

Numerical Example 4

UNIT: mm

SURFACE DATA

| Surface No. | r | d | nd | νd | Effective Diameter |
|---|---|---|---|---|---|
| 1 (Pupil Surface) | ∞ | 12.000 | | | 6.00 |
| 2* | 92.1187 | 2.469 | 1.54390 | 56.0 | 29.83 |
| 3 | ∞ | 0.500 | | | 32.56 |
| 4* | 255.9682 | 5.895 | 1.54390 | 56.0 | 34.31 |
| 5* | −55.9585 | 1.977 | | | 37.18 |
| 6* | −57.0394 | −1.977 | | | 40.89 |
| 7* | −55.9585 | −5.895 | 1.54390 | 56.0 | 40.86 |
| 8* | 255.9682 | −0.500 | | | 40.53 |
| 9 | ∞ | 0.500 | | | 40.27 |
| 10* | 255.9682 | 5.895 | 1.54390 | 56.0 | 40.01 |
| 11* | −55.9585 | 1.977 | | | 39.44 |
| 12* | −57.0394 | 2.000 | 1.63550 | 23.9 | 34.33 |
| 13* | 187.9194 | 1.287 | | | 33.55 |
| 14 | ∞ | 0.700 | 1.51633 | 64.1 | 50.00 |
| 15 | ∞ | 0.000 | | | 50.00 |
| Image Plane | ∞ | | | | |

| ASPHERIC DATA |
|---|
| 2nd Surface |
| K = 0.00000e+00, A4 = −7.71396e−06, A6 = 3.01476e−08, A8 = −6.47022e−10, A10 = 3.13945e−12, A12 = −6.74448e−15 |
| 4th Surface |
| K = 0.00000e+00, A4 = 6.43614e−06, A6 = −1.23597e−07, A8 = 3.51250e−10, A10 = −2.82863e−13 |
| 5th Surface |
| K = 0.00000e+00, A4 = −8.76583e−06, A6 = −2.94610e−09, A8 = 3.12165e−11 |

-continued

| UNIT: mm |
|---|
| 6th Surface |
| K = 0.00000e+00, A4 = 6.76801e−06, A6 = −2.78157e−08, A8 = 6.33436e−12, A10 = 4.44681e−14 |
| 7th Surface |
| K = 0.00000e+00, A4 = −8.76583e−06, A6 = −2.94610e−09, A8 = 3.12165e−11 |
| 8th Surface |
| K = 0.00000e+00, A4 = 6.43614e−06, A6 = −1.23597e−07, A8 = 3.51250e−10, A10 = −2.82863e−13 |
| 10th Surface |
| K = 0.00000e+00, A4 = 6.43614e−06, A6 = −1.23597e−07, A8 = 3.51250e−10, A10 = −2.82863e−13 |
| 11th Surface |
| K = 0.00000e+00, A4 = −8.76583e−06, A6 = −2.94610e−09, A8 = 3.12165e−11 |
| 12th Surface |
| K = 0.00000e+00, A4 = 6.76801e−06, A6 = −2.78157e−08, A8 = 6.33436e−12, A10 = 4.44681e−14 |
| 13th Surface |
| K = 0.00000e+00, A4 = −1.24198e−04, A6 = 7.73395e−07, A8 = −2.61649e−09, A10 = 3.27956e−12 |

| | |
|---|---|
| Focal Length | 16.482 |
| Fno | 2.747 |
| Half Angle of View | 50.022 |
| Image Height | 12.248 |
| Overall Lens Length | 43.571 |
| BF | 0.000 |
| Object Distance (from 1st Surface) | 1612.000 |

Single Lens Data

| Lens | Starting Surface | Focal Length |
|---|---|---|
| 1 | 1 | 169.367 |
| 2 | 4 | 84.993 |
| 3 | 7 | 84.993 |
| 4 | 10 | 84.993 |
| 5 | 12 | −68.638 |
| 6 | 14 | 0.000 |

Numerical Example 5

UNIT: mm

SURFACE DATA

| Surface No. | r | d | nd | νd | Effective Diameter |
|---|---|---|---|---|---|
| 1 (Pupil Surface) | ∞ | 12.000 | | | 6.00 |
| 2* | 179.2985 | 4.386 | 1.54390 | 56.0 | 33.15 |
| 3* | −89.6842 | 0.500 | | | 34.75 |
| 4* | −7675.3934 | 5.301 | 1.54390 | 56.0 | 35.47 |
| 5* | −116.1669 | 1.792 | | | 37.25 |
| 6* | −34.2971 | −1.792 | | | 38.70 |
| 7* | −116.1669 | −5.301 | 1.54390 | 56.0 | 39.32 |
| 8* | −7675.3934 | −0.500 | | | 38.87 |
| 9* | −89.6842 | 0.500 | | | 38.47 |
| 10* | −7675.3934 | 5.301 | 1.54390 | 56.0 | 38.38 |
| 11* | −116.1669 | 1.792 | | | 38.08 |
| 12* | −34.2971 | 2.000 | 1.63550 | 23.9 | 33.72 |
| 13* | −23.4013 | 1.245 | | | 32.42 |

-continued

| UNIT: mm | | | | | |
|---|---|---|---|---|---|
| 14 | ∞ | 0.700 | 1.51633 | 64.1 | 50.00 |
| 15 | ∞ | 0.000 | | | 50.00 |
| Image Plane | ∞ | | | | |

| ASPHERIC DATA |
|---|
| 2nd Surface |
| K = 0.00000e+00, A4 = 1.41088e−05, A6 = 8.05345e−08, A8 = −6.26486e−10, A10 = 2.05779e−12, A12 = −2.99519e−15 |
| 3rd Surface |
| K = 0.00000e+00, A4 = 2.73485e−07, A6 = 1.20954e−07, A8 = −3.92390e−10, A10 = 6.22562e−13, A12 = −6.33174e−16 |
| 4th Surface |
| K = 0.00000e+00, A4 = 4.11402e−06, A6 = −6.16892e−08, A8 = 5.93285e−11, A10 = 1.35030e−13 |
| 5th Surface |
| K = 0.00000e+00, A4 = −3.20323e−05, A6 = 6.08989e−08, A8 = −7.06670e−11 |
| 6th Surface |
| K = 0.00000e+00, A4 = 1.91606e−05, A6 = −1.30317e−09, A8 = −8.40911e−11, A10 = 1.88206e−13 |
| 7th Surface |
| K = 0.00000e+00, A4 = −3.20323e−05, A6 = 6.08989e−08, A8 = −7.06670e−11 |
| 8th Surface |
| K = 0.00000e+00, A4 = 4.11402e−06, A6 = −6.16892e−08, A8 = 5.93285e−11, A10 = 1.35030e−13 |
| 9th Surface |
| K = 0.00000e+00, A4 = 2.73485e−07, A6 = 1.20954e−07, A8 = −3.92390e−10, A10 = 6.22562e−13, A12 = −6.33174e−16 |
| 10th Surface |
| K = 0.00000e+00, A4 = 4.11402e−06, A6 = −6.16892e−08, A8 = 5.93285e−11, A10 = 1.35030e−13 |
| 11th Surface |
| K = 0.00000e+00, A4 = −3.20323e−05, A6 = 6.08989e−08, A8 = −7.06670e−11 |
| 12th Surface |
| K = 0.00000e+00, A4 = 1.91606e−05, A6 = −1.30317e−09, A8 = −8.40911e−11, A10 = 1.88206e−13 |
| 13th Surface |
| K = 0.00000e+00, A4 = 1.36338e−04, A6 = −4.92861e−07, A8 = 9.28427e−10, A10 = −7.73555e−13 |

| | |
|---|---|
| Focal Length | 16.454 |
| Fno | 2.742 |
| Half Angle of View | 49.324 |
| Image Height | 11.738 |
| Overall Lens Length | 43.108 |
| BF | 0.000 |
| Object Distance (from 1st Surface) | 1612.000 |

| Single Lens Data | | |
|---|---|---|
| Lens | Starting Surface | Focal Length |
| 1 | 1 | 110.548 |
| 2 | 4 | 216.810 |
| 3 | 7 | 216.810 |
| 4 | 10 | 216.810 |
| 5 | 12 | 108.194 |
| 6 | 14 | 0.000 |

Table 1 shows values related to each inequality in each example.

| | Ex. 1 | Ex. 2 | Ex. 3 | Ex. 4 | Ex. 5 |
|---|---|---|---|---|---|
| Lref/L | 0.78 | 0.78 | 0.73 | 0.79 | 0.72 |
| d2b/d2a | 0.53 | 0.51 | 0.51 | 0.57 | 0.66 |
| d2c/d2a | 0.47 | 0.47 | 0.47 | 0.50 | 0.63 |
| ν2 | 56.0 | 56.0 | 81.5 | 56.0 | 56.0 |
| rm2/ϕm2 | 1.1 | 1.17 | 1.11 | 1.39 | 0.89 |
| maxsag(mm) | 0.35 | 0.47 | 0.63 | 0.00 | 0.64 |

While the disclosure has been described with reference to examples, it is to be understood that the disclosure is not limited to the disclosed embodiments. The scope of the following claims is to be accorded the broadest interpretation so as to encompass all such modifications and equivalent structures and functions.

For example, in a combination with a display element such as an Organic Light Emitting Diode (OLED) or Liquid Crystal Display (LCD), electrical processing may be added to the display side depending on the distortion amount and the lateral chromatic aberration amount. In each example, one of the first transmissive reflective surface HM1 and the second transmissive reflective surface HM2 may be a polarization-selective transmissive reflective element (reflective polarizer) PBS. At this time, the other of the first transmissive reflective surface HM1 and the second transmissive reflective surface HM2 may be a half-mirror having a ratio of transmittance to reflectance of 1:1. The ratio between the transmittance and the reflectance may be changed as necessary. In addition, the optical system according to each example includes three lenses, i.e., the first lens L1, the second lens L2, and the third lens L3, as a plurality of lenses, but is not limited to this configuration, and is applicable to an optical system that includes four or more lenses.

Each example can provide a compact optical system having high optical performance.

This application claims the benefit of Japanese Patent Application No. 2023-008468, filed on Jan. 24, 2023, which is hereby incorporated by reference herein in its entirety.

What is claimed is:

1. An optical system configured to guide a light beam from a display surface to a pupil surface, the optical system comprising, in order from a pupil surface side to a display surface side:

a first lens having a first transmissive reflective surface on the display surface side;

a second lens; and a third lens having a second transmissive reflective surface on the pupil surface side, wherein a quarter waveplate is provided to a surface on the pupil surface side of the second lens, wherein the second lens and the third lens are spaced apart from each other, wherein the light beam from the display surface transmits through the third lens and the second lens in this order, is reflected by the first transmissive reflective surface toward the display surface, transmits through the second lens, and is reflected toward the pupil surface by the second transmissive reflective surface, transmits through the second lens and the first lens in this order, and enters the pupil surface in this order, and wherein a following inequality is satisfied:

$$0.25 \leq Lref/L \leq 1.00$$

where Lref is a distance on an optical axis between the first transmissive reflective surface and the second transmissive reflective surface, and L is a distance on the optical axis from an optical surface closest to the pupil surface to the display surface.

2. The optical system according to claim 1, wherein a following inequality is satisfied:

$$0.25 \leq d2b/d2a \leq 0.80$$

where d2$a$ is a thickness on an optical axis of the second lens, and d2$b$ is a thickness of the second lens at a position that is separated by 15 mm from the optical axis in a direction orthogonal to the optical axis.

3. The optical system according to claim 1, wherein a following inequality is satisfied:

$$30 \leq \nu 2 \leq 97$$

where v2 is an Abbe number of the second lens based on d-line.

4. The optical system according to claim 1, wherein a following inequality is satisfied:

$$0.0 \leq \text{maxsag} \leq 2.0$$

where maxsag (mm) is a distance in an optical axis direction from a position closest to the pupil surface to a position closest to the display surface among the effective areas of the first transmissive reflective surface.

5. The optical system according to claim 1, wherein the third lens moves during diopter adjustment.

6. The optical system according to claim 1, wherein one of the first transmissive reflective surface and the second transmissive reflective surface is a polarizer configured to separate incident light into reflected light and transmitting light according to a polarization state.

7. The optical system according to claim 6, wherein the polarizer includes a plurality of convex portions made of metal or dielectric, and an array pitch of the plurality of convex portions is 200 nm or less.

8. The optical system according to claim 1, wherein a surface on the pupil surface side of the first lens is a diffractive surface.

9. A display apparatus comprising:

the optical system according to claim 1; and a display element including a display surface.

10. An optical system configured to guide a light beam from a display surface to a pupil surface, the optical system comprising, in order from a pupil surface side to a display surface side:

a first lens having a first transmissive reflective surface on the display surface side;

a second lens; and a third lens having a second transmissive reflective surface on the pupil surface side, wherein a quarter waveplate is provided to a surface on the pupil surface side of the second lens, wherein the second lens and the third lens are spaced apart from each other, wherein the light beam from the display surface transmits through the third lens and the second lens in this order, is reflected by the first transmissive reflective surface toward the display surface, transmits through the second lens, and is reflected toward the pupil surface by the second transmissive reflective surface, transmits through the second lens and the first lens in this order, and enters the pupil surface in this order, and wherein a following inequality is satisfied:

$$0.25 \leq d2b/d2a \leq 0.80$$

where d2a is a thickness on an optical axis of the second lens, and d2b is a thickness of the second lens at a position that is separated by 15 mm from the optical axis in a direction orthogonal to the optical axis.

11. A display apparatus comprising:

the optical system according to claim 10; and a display element including a display surface.

12. An optical system configured to guide a light beam from a display surface to a pupil surface, the optical system comprising, in order from a pupil surface side to a display surface side:

a first lens having a first transmissive reflective surface on the display surface side;

a second lens; and a third lens having a second transmissive reflective surface on the pupil surface side, wherein a quarter waveplate is provided to a surface on the pupil surface side of the second lens, wherein the second lens and the third lens are spaced apart from each other, wherein the light beam from the display surface transmits through the third lens and the second lens in this order, is reflected by the first transmissive reflective surface toward the display surface, transmits through the second lens, and is reflected toward the pupil surface by the second transmissive reflective surface, transmits through the second lens and the first lens in this order, and enters the pupil surface in this order, and wherein a following inequality is satisfied:

$$0.0 \leq \text{maxsag} \leq 2.0$$

where maxsag (mm) is a distance in an optical axis direction from a position closest to the pupil surface to a position closest to the display surface among the effective areas of the first transmissive reflective surface.

13. A display apparatus comprising:

the optical system according to claim 12; and a display element including a display surface.

* * * * *